(12) United States Patent
Sato

(10) Patent No.: US 10,823,902 B2
(45) Date of Patent: Nov. 3, 2020

(54) PRINT HEAD

(71) Applicant: Futaba Corporation, Mobara-shi, Chiba (JP)

(72) Inventor: Tomoya Sato, Mobara (JP)

(73) Assignee: FUTABA CORPORATION, Chiba (JP)

( * ) Notice: Subject to any disclaimer, the term of this patent is extended or adjusted under 35 U.S.C. 154(b) by 0 days.

(21) Appl. No.: 16/537,289

(22) Filed: Aug. 9, 2019

(65) Prior Publication Data

US 2020/0049879 A1 Feb. 13, 2020

(30) Foreign Application Priority Data

Aug. 10, 2018 (JP) ................................ 2018-151210

(51) Int. Cl.
*F21V 8/00* (2006.01)
*G03G 15/04* (2006.01)

(52) U.S. Cl.
CPC ..... *G02B 6/0066* (2013.01); *G03G 15/04063* (2013.01)

(58) Field of Classification Search
None
See application file for complete search history.

(56) References Cited

U.S. PATENT DOCUMENTS

| 2003/0202751 | A1* | 10/2003 | Murali | G02B 6/3672 |
| | | | | 385/52 |
| 2004/0179796 | A1* | 9/2004 | Jakobsen | C03B 37/01205 |
| | | | | 385/123 |
| 2005/0036029 | A1 | 2/2005 | Pilossof et al. | |
| 2005/0232560 | A1* | 10/2005 | Knight | C03B 37/0124 |
| | | | | 385/125 |
| 2012/0223214 | A1* | 9/2012 | Lee | H01L 27/14621 |
| | | | | 250/208.1 |
| 2014/0192515 | A1* | 7/2014 | Kim | G02F 1/133553 |
| | | | | 362/97.1 |

FOREIGN PATENT DOCUMENTS

| CN | 1232994 | 10/1999 |
| CN | 101308250 | 11/2008 |
| CN | 101408748 | 4/2009 |
| CN | 107000447 | 8/2017 |
| CN | 206515603 | 9/2017 |
| JP | H10-181089 | 7/1998 |
| JP | 2000-156285 | 6/2000 |
| JP | 2005-271574 | 10/2005 |
| JP | 2009-137107 | 6/2009 |
| JP | 2011-131457 | 7/2011 |
| TW | 200821780 | 5/2008 |
| WO | 2016/080257 | 5/2016 |
| WO | 2018/124012 | 7/2018 |

* cited by examiner

*Primary Examiner* — Vip Patel
(74) *Attorney, Agent, or Firm* — Hamre, Schumann, Mueller & Larson, P.C.

(57) ABSTRACT

A print head includes a light guide portion including a light blocking part having a lattice shape, and a plurality of light guide paths defined by the light blocking part, and a light emitting element array in which a plurality of organic EL elements emitting light incident to each light guide path are arranged. In the print head, the plurality of light guide paths of the light guide portion are designed to have an identical width of 30 μm or less, and thus it is possible to reduce exposure unevenness which is one of exposure characteristics.

7 Claims, 7 Drawing Sheets

PRINT HEAD

CROSS-REFERENCE TO RELATED APPLICATIONS

This application is based upon and claims the benefit of priority from Japanese Patent Application No. 2018-151210, filed on 10 Aug., 2018, the entire contents of which are incorporated herein by reference.

TECHNICAL FIELD

The present disclosure relates to a print head.

BACKGROUND

In recent years, a print head in which a light emitting element such as an organic EL element is used for a light source has been developed. In an optical system print head, as an optical system for imaging light from a light source, a GRIN lens such as a Selfoc lens array (Selfoc is a registered trademark of Nippon Sheet Glass Co., Ltd.) is typically used (for example, Japanese Unexamined Patent Publication No. 2000-156285).

SUMMARY

However, the GRIN lens has a relatively large dimension, and, in a case where a light emitting element is formed on a substrate, the GRIN lens is required to be provided on a substrate surface (rear surface) on an opposite side a substrate surface (front surface) on which the light emitting element is formed, and thus a dimension of a print head is increased.

The present inventors have studied miniaturization of a print head, and have found that substantially parallel light can be obtained by using a member provided with a light blocking part having a lattice section instead of the GRIN lens. The present inventors have further studied the member provided with a light blocking part having a lattice section, and have newly found a technique capable of improving exposure characteristics.

According to the present disclosure, a print head capable of improving exposure characteristics is provided.

According to an aspect of the present disclosure, there is provided a print head emitting imaging light, including a light guide portion extending in a first direction and including a light blocking part and a plurality of light guide paths, the light blocking part having a lattice shape when viewed from the first direction, the plurality of light guide paths defined by the light blocking part, or the light blocking part including a plurality of light guide paths disposed in parallel or disposed in a zigzag shape when viewed from the first direction and a light blocking part defining the light guide paths, the light blocking part and the light guide paths are alternately arranged in the light guide portion in a second direction perpendicular to the first direction; and a light emitting element array disposed on one side of the light guide portion in the first direction, a plurality of light emitting elements emitting light incident to each of the light guide paths are arranged in the light emitting element array at an equal interval in the second direction, in which the plurality of light guide paths have an identical width of 30 μm or less in the second direction.

The present inventors have newly found that a plurality of light guide paths of the light guide portion have an identical width of 30 μm or less, and thus exposure unevenness is reduced such that exposure characteristics of the print head are improved.

In the print head according to another aspect of the present disclosure, the width of the plurality of light guide paths is equal to or more than 10 μm. In this case, it is possible to obtain a sufficient light amount in practical use in exposure.

In the print head according to still another aspect of the present disclosure, a width of the light blocking part at a location interposed between the light guide paths adjacent to each other in the second direction is equal to or less than 15 μm.

In the print head according to still another aspect of the present disclosure, the light guide path has a perfect circular shape or a polygonal shape in a cross section orthogonal to the first direction.

In the print head according to still another aspect of the present disclosure, the light emitting element is an organic EL element.

DETAILED DESCRIPTION

Figure 1:
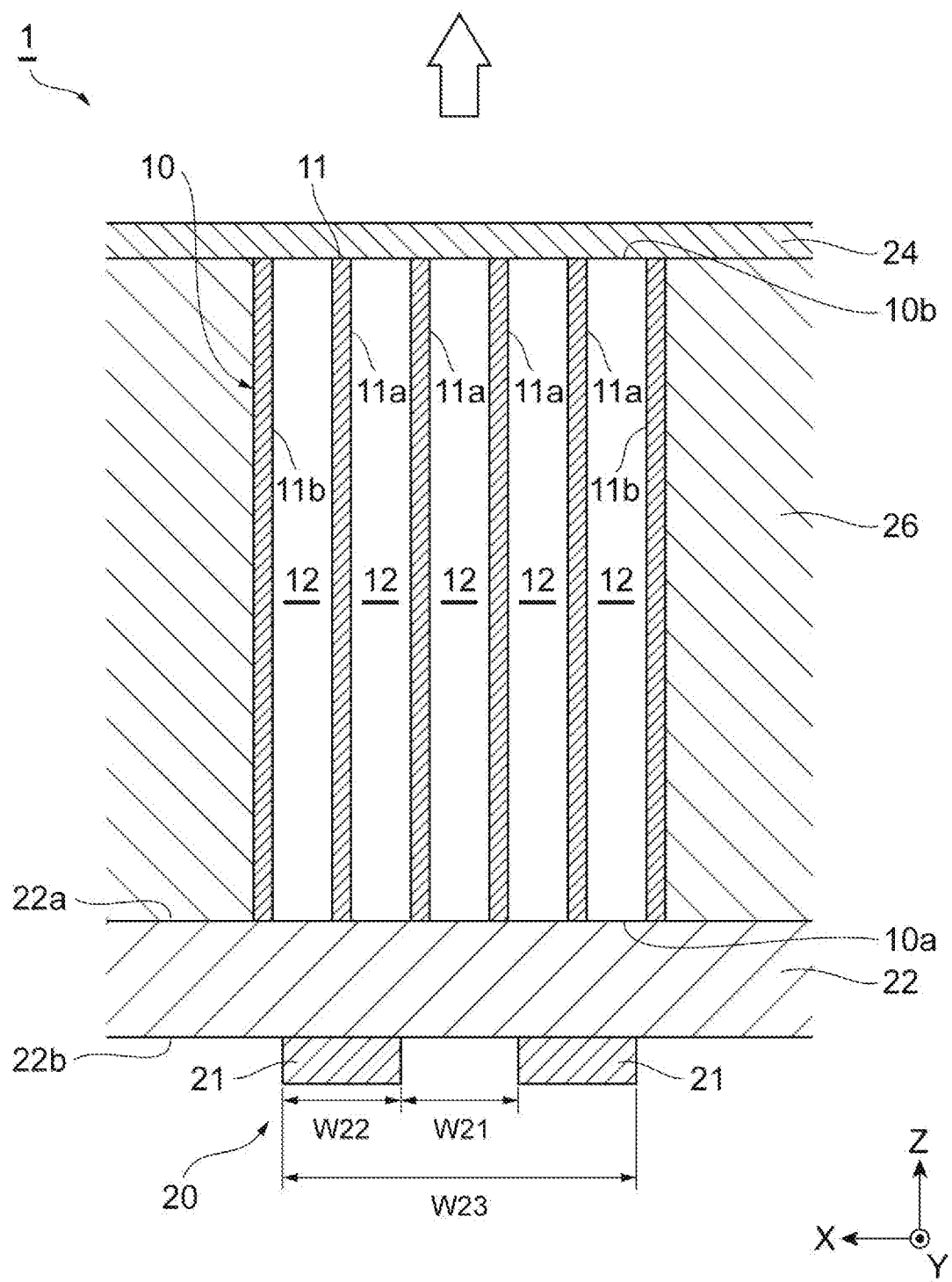
FIG. 1 is a cross-sectional view illustrating a print head according to an embodiment.

Hereinafter, with reference to the accompanying drawings, an embodiment of the present disclosure will be described in detail. In the following description, an identical reference numeral will be given to an identical element or an element having an identical function, and a repeated description will not be made.

A print head 1 according to an embodiment is configured to include a light guide portion 10 and a light emitting element array 20 as illustrated in FIG. 1.

Figure 2:
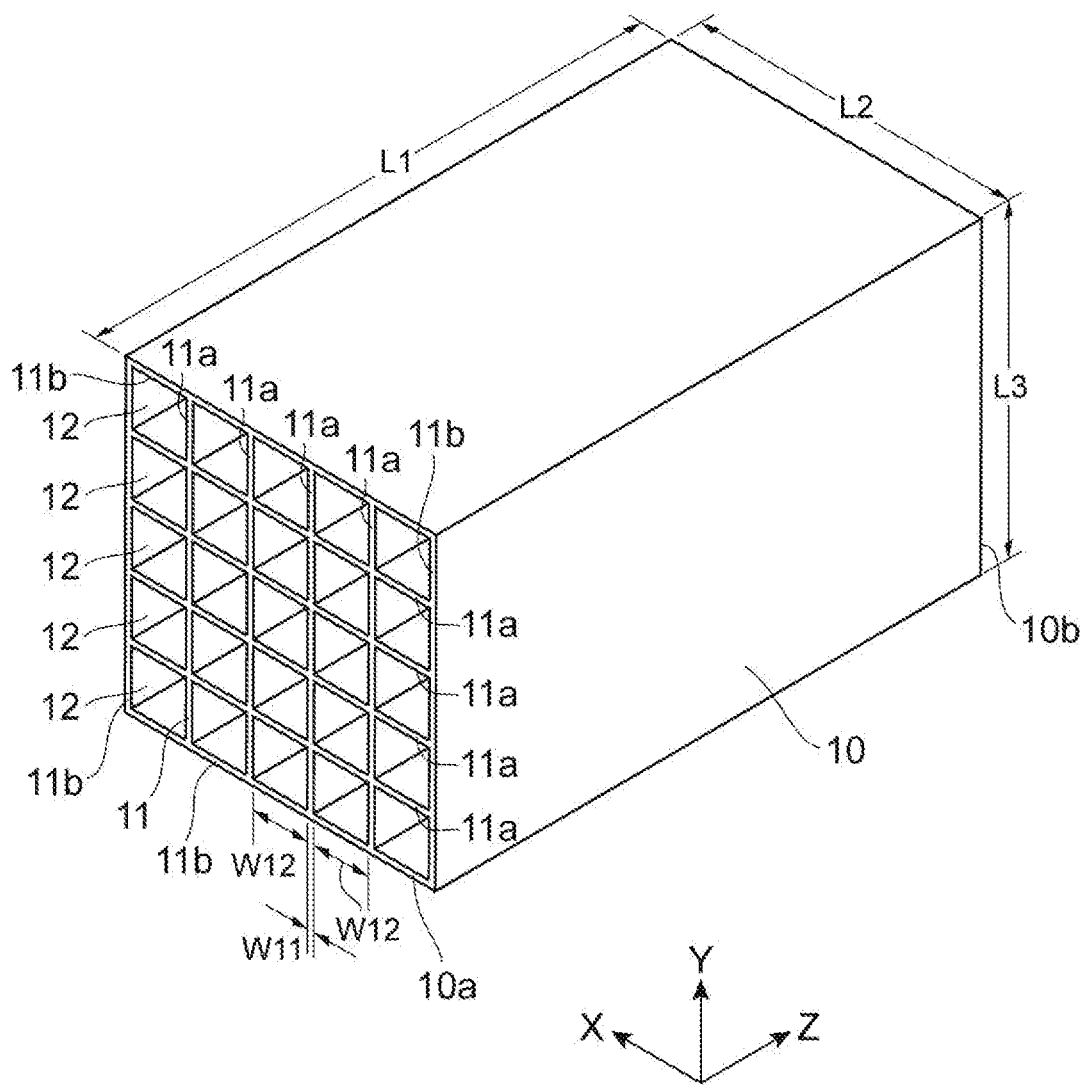
FIG. 2 is a perspective view illustrating a light guide portion in FIG. 1.

As illustrated in FIGS. 1 and 2, the light guide portion 10 has a square columnar outer shape, and extends in one direction. In the following description, the extending direction of the light guide portion 10 will be referred to as a Z direction (first direction), a direction along one side of the light guide portion 10 in a square cross section orthogonal to the Z direction will be referred to as an X direction (second direction), and a direction orthogonal to the X direction in the square cross section will be referred to as a Y direction.

The light guide portion 10 is configured to include a light blocking part 11 and a plurality of light guide paths 12.

The light blocking part 11 is configured with a plurality of partition walls 11a and a plurality of outer peripheral walls 11b. The light blocking part 11 is made of a material having high light blocking property (for example, a black matrix material or a plating material). The light blocking part 11 has a lattice shape when viewed from the Z direction, and, more specifically, a square lattice shape. In other words, in an XY cross section (and an end surface) of the light guide portion 10, the plurality of light guide paths 12 having a square shape are disposed in parallel. In the present embodiment, the light blocking part 11 includes four partition walls 11a arranged in the X direction, four partition walls 11a arranged in the Y direction, and four outer peripheral walls 11b forming an outer peripheral surface of the light guide portion 10, and has a lattice shape of five rows and five columns. The number of rows and columns of lattices of the light blocking part 11 may be changed as appropriate.

The light guide paths 12 are air gaps defined by the light blocking part 11. In the present embodiment, the light guide portion 10 includes twenty-five light guide paths 12. An interval between the partition walls 11a adjacent to each other (an interval between the partition wall 11a and the outer peripheral wall 11b) of the light blocking part 11 is designed to be uniform, and thus the light guide paths 12 all have an identical opening dimension and an identical cross section dimension. In the light guide portion 10, in an end surface and an XY cross section, the partition walls 11a and the light guide paths 12 of the light blocking part 11 are alternately arranged in the X direction, and the partition walls 11a and the light guide paths 12 of the light blocking part 11 are alternately arranged in the Y direction.

In the present embodiment, a length L1 of the light guide portion 10 in the Z direction is 100 to 300 μm (as an example, 150 μm). A length L2 of the light guide portion 10 in the X direction and a length L3 thereof in the Y direction are changed depending on the number of rows and columns of the lattices of the light blocking part 11, and may be designed to be the same as or larger than a dimension of the light emitting element array 20.

In the present embodiment, a width W11 of each of the partition walls 11a arranged in the X direction is designed to be equal to or less than 15 μm, and is 10 μm as an example. Each of the partition walls 11a arranged in the Y direction is designed to have the same width as the width W11 of each of the partition walls 11a arranged in the X direction. In the present embodiment, a width W12 of each light guide path 12 in the X direction is designed to be 10 μm or more to 30 μm or less, and is 15 μm as an example. A width of each light guide path 12 in the Y direction is designed to be the same as the width W12.

In the present embodiment, the length L1 of the light guide portion 10 in the Z direction is designed to ten times the width W12 of the light guide path 12.

Each light guide path 12 of the light blocking part 11 may be filled with a light transmissive member. Each light guide path 12 may be completely embedded with a light transmissive member.

The light blocking part 11 of the light guide portion 10 may be formed through injection molding. In this case, as a constituent material of the light blocking part 11, a resin having light blocking property may be used. The light blocking part 11 may be formed through injection molding, and then each light guide path 12 may be filled with a light transmissive resin which is an example of the light transmissive member by using a photolithography technique or a nanoimprint technique. The light blocking part 11 of the light guide portion 10 may be formed by using a MEMS technique. In this case, silicon may be used as a constituent material of the light blocking part 11. The light blocking part 11 may be formed by using the MEMS technique, and then each light guide path 12 may be filled with a light transmissive resin which is an example of the light transmissive member by using a photolithography technique or a nanoimprint technique.

In a case of forming the light guide portion 10 having a configuration in which each light guide path 12 is embedded with the light transmissive member, the light blocking part 11 may be formed after the light transmissive member is formed. For example, a light transmissive resin which is an example of the light transmissive member is molded to a shape of the light guide path 12 by using a photolithography technique or a nanoimprint technique. After the light transmissive member is molded, a material having high light blocking material is caused to flow into voids of the light transmissive member, and thus the light blocking part 11 is formed. In this case, a black resin may be used as a constituent material of the light blocking part 11.

As illustrated in FIG. 1, a base 22 is disposed on one end surface 10a (a lower end surface in FIG. 1) side of the light guide portion 10. The base 22 has a tabular shape, and is made of a light transmissive material. In the present embodiment, the base 22 is a glass substrate. A thickness (that is, a Z direction length) of the base 22 is 0.1 mm as an example. One surface 22a of the base 22 faces the end surface 10a of the light guide portion 10, and is in contact with the end surface 10a.

The light emitting element array 20 is provided on the other surface 22b of the base 22. The light emitting element array 20 includes a plurality of organic EL elements 21 arranged at an equal interval. FIG. 1 illustrates the organic EL elements 21 arranged in the X direction, but the organic EL elements 21 of the light emitting element array 20 may be arranged in a lattice shape or a zigzag shape in an X-Y plane. In the present embodiment, a separation width W21 of the organic EL elements 21 adjacent to each other in the X direction is 80 μm, and a width W22 of the organic EL element 21 in the X direction is 80 μm. A width W23 of the light emitting element array 20 may be designed to be smaller than the width (corresponding to L2 in FIG. 2) of the light guide portion 10. Each organic EL element 21 may have a square shape, a rectangular shape, or a polygonal shape (for example, an octagonal shape) when viewed from the Z direction.

The organic EL element 21 is an organic EL element emitting monochromatic white light as an example. The organic EL element 21 has a structure in which an organic EL layer is interposed between a pair of electrodes in a thickness direction thereof (the thickness direction of the base 22, that is, the Z direction). Of the pair of electrodes, an electrode on the light guide portion 10 side is a transparent electrode made of, for example, indium tin oxide (ITO) or indium zinc oxide (IZO). The organic EL layer is a layer containing at least an organic compound (light emitting material) which emits light due to injection of electrons or holes. The organic compound may be a low-molecular compound, and may be a high-molecular compound. The organic EL layer may include an electron injection layer, an electron transport layer, a hole injection layer, and a hole transport layer in addition to the light emitting layer containing the light emitting material. A light emitting material of the organic EL layer may be a fluorescent material, and may be a phosphorescent material. In FIG. 1, a wiring or a drive circuit supplying drive power to each organic EL element 21 is not illustrated.

The other end surface 10b (an upper end surface in FIG. 1) of the light guide portion 10 is covered with a film 24. The film 24 is provided to prevent dust from entering the inside of the light guide portion 10. The film 24 may be omitted as appropriate.

The print head 1 is provided with a holding member 26 surrounding the periphery of the light guide portion 10 on one surface 22a of the base 22. The holding member 26 holds the light guide portion 10 on the periphery of the light guide portion 10. The holding member 26 is provided to be coplanar with the end surface 10b of the light guide portion 10. The holding member 26 may be made of a light blocking material, and may be made of a light transmissive material (for example, a light transmissive resin material such as an epoxy resin or an acrylic resin). In a case where the holding member 26 has light transmissive property, the holding member 26 may be made of the same material as that of a light transmissive member filling the light guide path 12. There may be an aspect in which the print head 1 does not include the holding member 26.

In the print head 1, in a case where drive power is supplied to each organic EL element 21 of the light emitting element array 20 which is a light source, light is generated from each organic EL element 21. The light generated from the organic EL element 21 is incident to each light guide path 12 from one end surface 10a side of the light guide portion 10 via the base 22. Among light beams incident to the light guide paths 12, only light parallel to the extending direction (that is, the Z direction and the extending direction of the light guide portion 10) of the light guide path 12 or light substantially parallel thereto selectively passes through the light guide path 12, and is emitted from the other end surface 10b of the light guide portion 10. In other words, the light incident to the light guide path 12 from the light emitting element array 20 passes through the light guide path 12 so as to be converted into light substantially parallel to the extending direction of the light guide path 12, and thus directivity can be increased. In other words, high-directivity light is emitted from the end surface 10b of the light guide portion 10.

An exposure target (not illustrated) of the print head 1 is disposed at a position facing the end surface 10b of the light guide portion 10. The exposure target is irradiated with high-directivity light from the print head 1. The exposure target is disposed near the end surface 10b of the light guide portion 10 from the viewpoint of realizing a high resolution, and is disposed near the end surface 10b of the light guide portion 10 by about 100 μm as an example. The exposure target may be disposed to be brought into contact with the film 24.

In the print head 1, the plurality of light guide paths 12 of the light guide portion 10 are designed with an identical width of 15 μm, and thus high exposure characteristics are realized. Specifically, since the plurality of light guide paths 12 of the light guide portion 10 are designed with an identical width of 30 μm or less, exposure unevenness which is one of exposure characteristics can be reduced. Since the plurality of light guide paths 12 of the light guide portion 10 are designed with an identical width of 10 μm or more, a light amount which is one of exposure characteristics can be sufficiently obtained.

Here, exposure characteristics of the print head 1 will be described with reference to FIGS. 3A, 3B, 4, and 5.

Figure 3A:
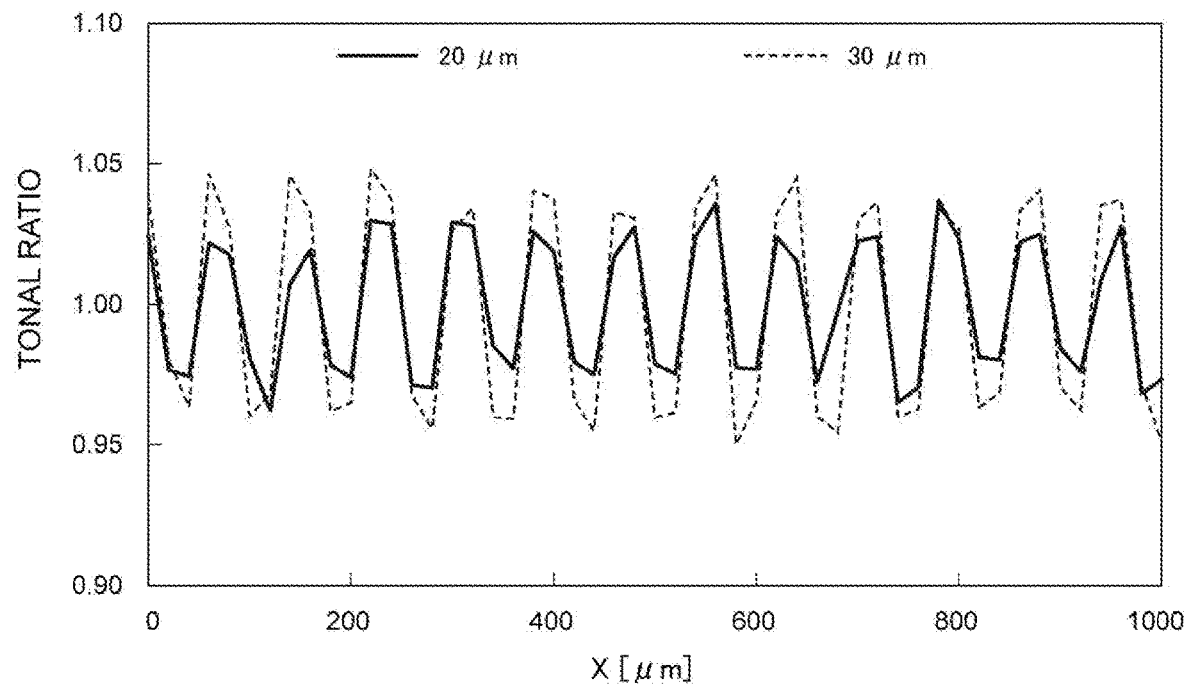
FIGS. 3A and 3B are simulation result graphs illustrating a relationship between a width of a light guide path and a tonal ratio.
Figure 3B:
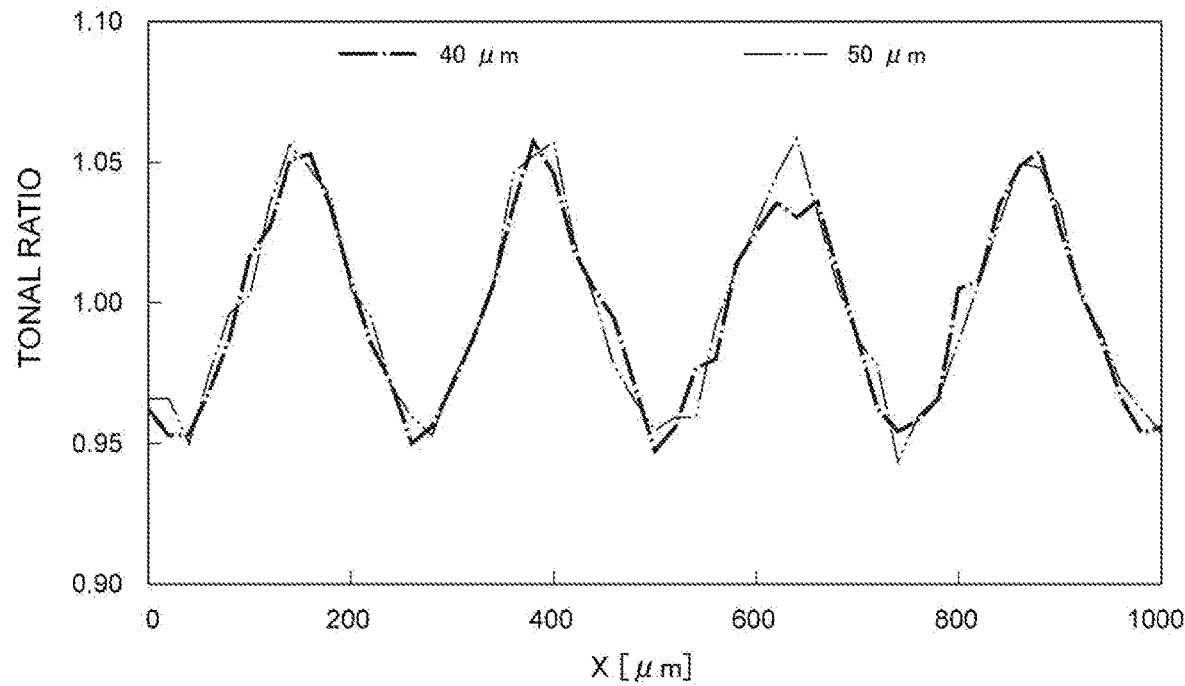

In relation to exposure unevenness which is one of the exposure characteristics, the present inventors have checked a relationship between the width W12 of the light guide path 12 and a tonal ratio through simulation. In the simulation, light-ray tracking calculation was performed according to a Monte Carlo method by using optical system analysis software. In the simulation, a separation distance between an exposure target and the light guide path 12 (that is, a separation distance between the exposure target and the end surface 10b of the light guide portion 10) was 100 μm. Simulation results are as illustrated in FIGS. 3A and 3B. In graphs of FIGS. 3A and 3B, a transverse axis expresses a position [μm] in the X direction (main scanning direction), and a longitudinal axis expresses a tonal ratio. In FIG. 3A, a tonal ratio of when the width W12 of the light guide path 12 is 20 μm is indicated by a solid line, and a tonal ratio of when the width W12 of the light guide path 12 is 30 μm is indicated by a dashed line. In FIG. 3B, a tonal ratio of when the width W12 of the light guide path 12 is 40 μm is indicated by a dot chain line, and a tonal ratio of when the width W12 of the light guide path 12 is 50 μm is indicated by a two-dot chain line.

From the graph of FIG. 3A, it was checked that a cycle of exposure unevenness (streak unevenness) is shortened (about 80 μm) in cases where the width W12 of the light guide path 12 is 20 μm and 30 μm. On the other hand, from the graph of FIG. 3B, it was checked that a cycle of exposure unevenness is lengthened (about 230 μm) in cases where the width W12 of the light guide path 12 is 40 μm and 50 μm.

Figure 4:
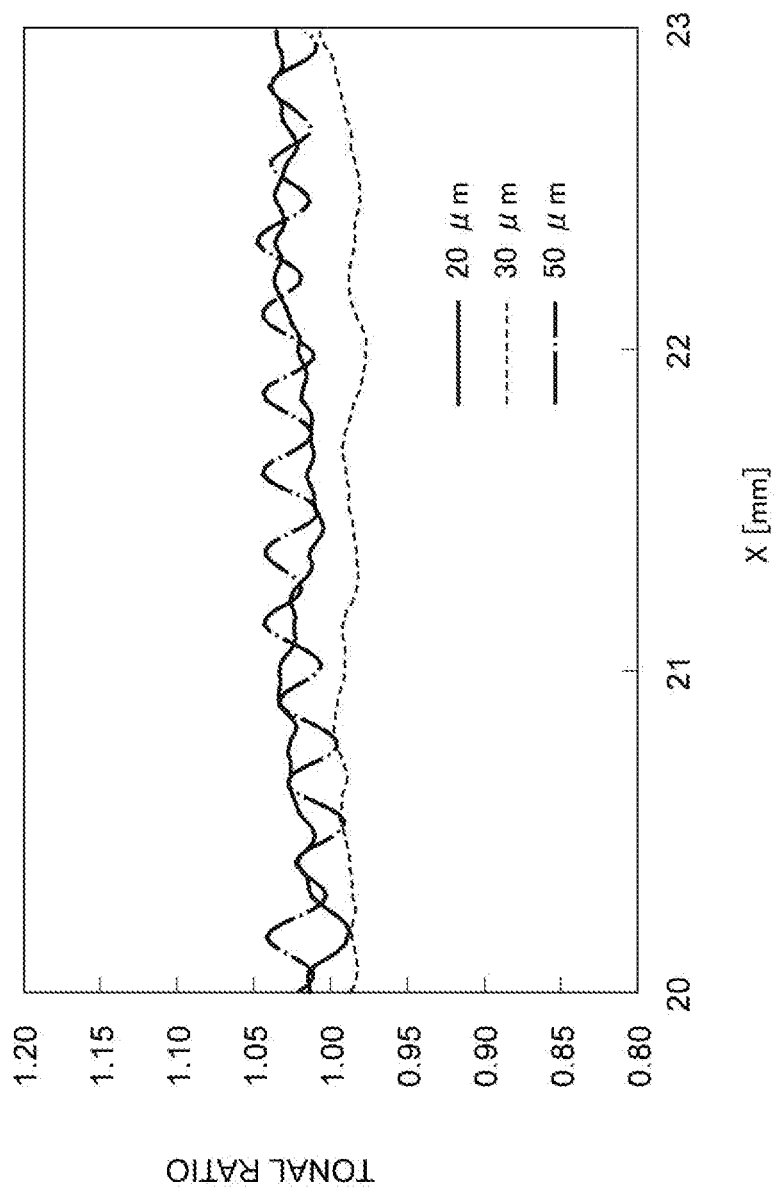
FIG. 4 is an actually measured data graph illustrating a relationship between a width of a light guide path and a tonal ratio.

The graph of FIG. 4 illustrates actually measured data indicating a relationship between the width W12 of the light guide path 12 and a tonal ratio. In the graph of FIG. 4, a transverse axis expresses a position [mm] in the X direction, and a longitudinal axis expresses a tonal ratio. In FIG. 4, a tonal ratio of when the width W12 of the light guide path 12 is 20 μm is indicated by a solid line, a tonal ratio of when the width W12 of the light guide path 12 is 30 μm is indicated by a dashed line, and a tonal ratio of when the width W12 of the light guide path 12 is 50 μm is indicated by a dot chain line.

From the graph of FIG. 4, it was also checked that exposure unevenness scarcely occurs in a case where the width W12 of the light guide path 12 is equal to or less than 30 μm, but exposure unevenness occurs in a long cycle in a case where the width W12 of the light guide path 12 exceeds 30 μm (that is, in a case of 50 μm).

From the above results, it was checked that the width W12 of the light guide path 12 is designed to be equal to or less than 30 μm, and thus a cycle of exposure unevenness is reduced to about ⅓ compared with a case of the width W12 of the light guide path 12 exceeds 30 μm. In other words, according to the print head 1 in which the width W12 of the light guide path 12 is equal to or less than 30 μm, it is possible to realize high exposure characteristics.

The exposure unevenness is caused by a shadow of the partition wall 11a, does not occur in a case where the width W22 of the organic EL element 21 is the same as the width W12 of the light guide path 12, the separation width W21 of the organic EL elements 21 is the same as the width W11 of the partition wall 11a, and the organic EL element 21 is completely positioned with the light guide path 12, but may occur in other cases. Thus, as in the embodiment, the exposure unevenness occurs in a case where the organic EL element 21 has the width W22 larger than the width W12 of the light guide path 12. Even in a case where the organic EL element 21 has the width W22 which is the same as the width W12 of the light guide path 12, it is considerably difficult to accurately position the organic EL element 21 with the light guide path 12 via the base 22, and thus the exposure unevenness may occur. In a case where an exposure target is disposed near the light guide portion 10 as in the embodiment, a resolution is increased, but the exposure unevenness easily occurs. The print head 1 can effectively reduce the exposure unevenness under the condition in which the exposure unevenness occurs.

Figure 5:
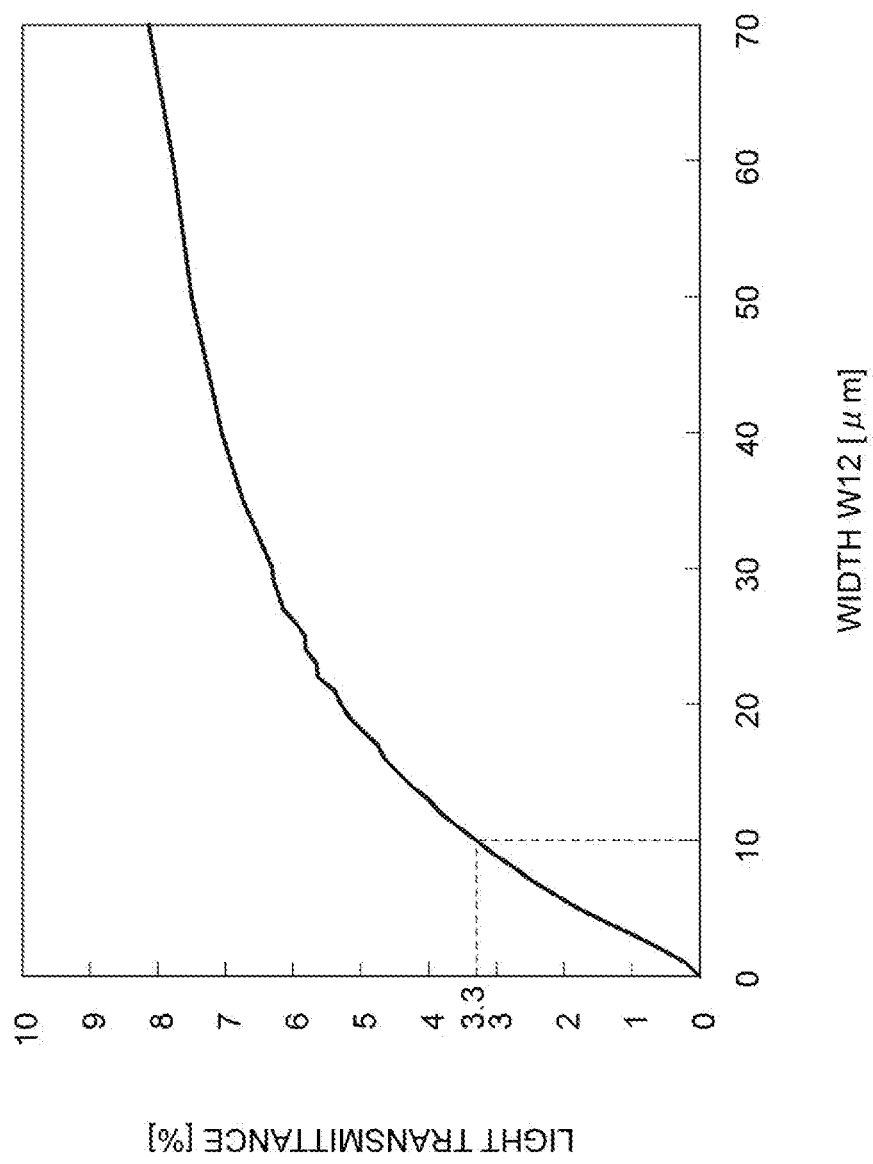
FIG. 5 is a graph illustrating a relationship between a width of a light guide path and light transmissive efficiency.

The present inventors have checked a relationship between the width W12 of the light guide path 12 and a light transmittance through simulation in relation to a light amount which is one of the exposure characteristics. A measurement result is as illustrated in FIG. 5. In a graph of FIG. 5, a transverse axis expresses the width W12 [μm] of the light guide path 12, and a longitudinal axis expresses a light transmittance [%].

From the graph of FIG. 5, it was checked that, as the width W12 of the light guide path 12 increases, a light transmittance increases (monotonously increases). In other words, in a case where the width W12 of the light guide path 12 is reduced, and thus an aperture (an area ratio of the light guide path 12 in an XY cross section) is reduced, the light transmittance is reduced, and, as a result, an image becomes dark. In order to obtain a sufficiently bright image in practical use, a light transmittance of about 3.3% or more is necessary. As illustrated in the graph of FIG. 5, since the width W12 of the light guide path 12 at which a light transmittance is 3.3% is 10 μm, the width W12 of the light guide path 12 is designed to be equal to or more than 10 μm, and thus a sufficient light amount in practical use can be obtained. In other words, according to the print head 1 in which the width W12 of the light guide path 12 is equal to or more than 10 μm, it is possible to realize higher exposure characteristics.

The exposure unevenness may be reduced by separating an exposure target from the light guide portion 10, or disposing an optical component such as a diffusion plate or a lens between an exposure target and the light guide portion 10. However, in this case, problems such as a reduction in a resolution, an increase in a size of a device, an increase in the number of components, and complication of manufacturing steps occur. In other words, the print head 1 can reduce exposure unevenness while preventing the problems such as a reduction in a resolution, an increase in a size of a device, an increase in the number of components, and complication of manufacturing steps.

The print head according to the present disclosure is not limited to the embodiment, and may be variously modified.

For example, light generated from an organic EL element may be monochromatic light such as red light or blue light instead of white light. A light emitting element configuring the light emitting element array is not limited to an organic EL element, and may be a liquid crystal element or a fluorescent display tube. A color filter may be provided between a light emitting element and a base, and colored light may be emitted from the end surface 10b of the light guide portion 10 while using a light emitting element generating monochromatic white light. For example, light may be colored to each color of RGB with color filters, and thus full-color light may be emitted from the end surface 10b of the light guide portion 10.

As the base 22, not only a glass substrate but also a silicon substrate or a plastic substrate may be used. The base 22 may be flexible, and, in this case, for example, a resin film such as a polyethylene terephthalate (PET) film or a polyimide (PI) film may be used.

An opening shape and a cross-sectional shape of the light guide path of the light guide portion are not limited to a square shape, and may be a rectangular shape, a linear shape, and a polygonal shape, a circular shape, or an elliptical shape other than a quadrangular shape. The light guide path of the light guide portion may be disposed in a zigzag shape when viewed from the extending direction of the light guide portion. The number of light guide paths of the light guide portion or the number of light emitting elements may be changed as appropriate. An antireflection film which is formed through plating or heat treatment may be provided on an inner surface wall of the light guide path of the light guide portion in order to suppress reflection at the inner wall surface.

The light guide portion may have aspects as illustrated in FIGS. 6A and 6B and FIGS. 7A to 7C. FIGS. 6A and 6B and FIGS. 7A to 7C all illustrate cross-sectional shapes of the light guide portion in an XY cross section orthogonal to the extending direction (Z direction) of the light guide paths.

Figure 6A:
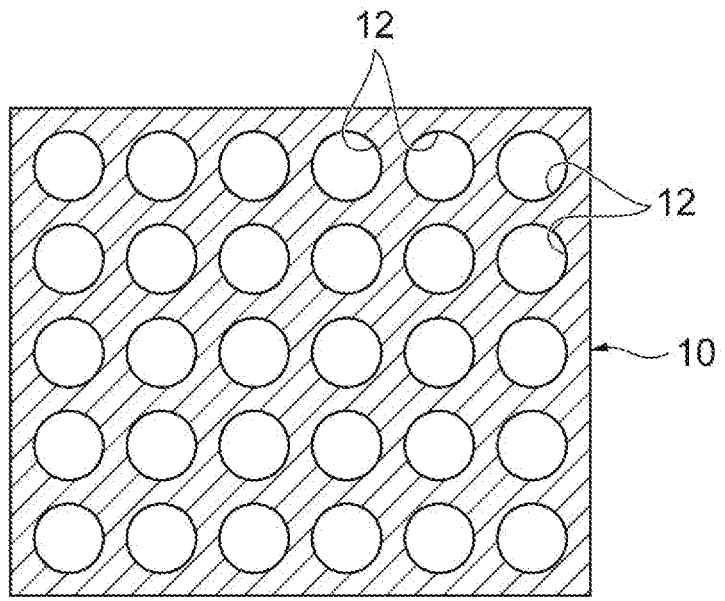
FIGS. 6A and 6B are cross-sectional views illustrating light guide portions according to other aspects.
Figure 6B:
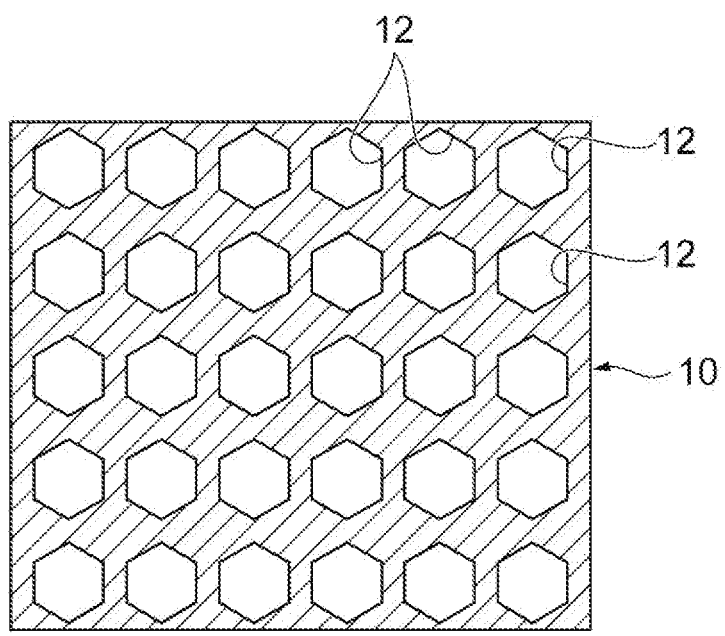

In the light guide portion 10 illustrated in FIGS. 6A and 6B, in the cross section (and the end surface), the plurality of light guide paths 12 are disposed in parallel at a predetermined interval (at 10 μm interval as an example). Each of the light guide paths 12 of the light guide portion 10 illustrated in FIG. 6A has a perfect circular cross-sectional shape (30 μm in diameter as an example), and each of the light guide paths 12 of the light guide portion 10 illustrated in FIG. 6B has a hexagonal cross-sectional shape (30 μm in width as an example).

Figure 7A:
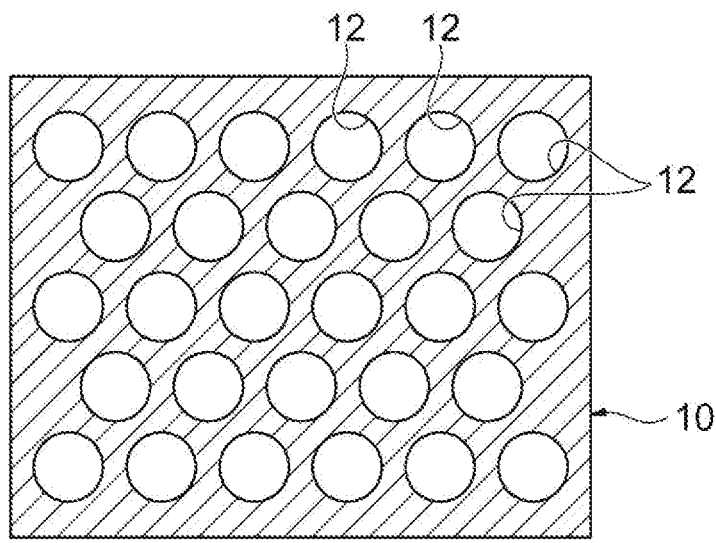
FIGS. 7A to 7C are cross-sectional views illustrating light guide portions according to still other aspects.
Figure 7B:
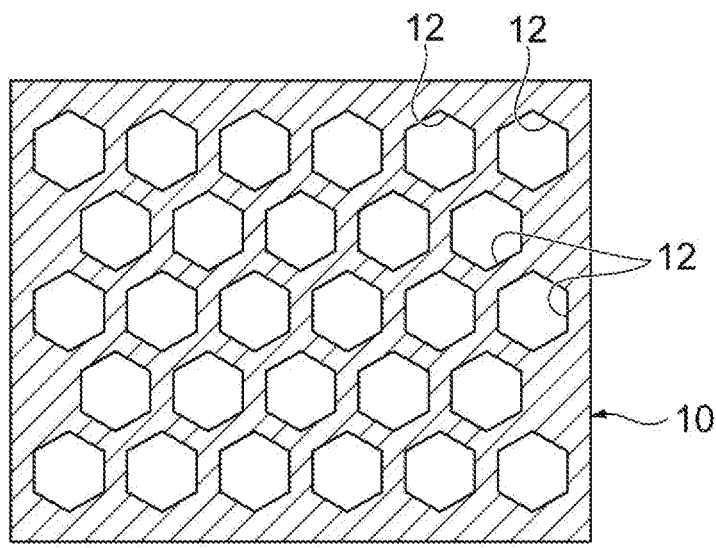
Figure 7C:
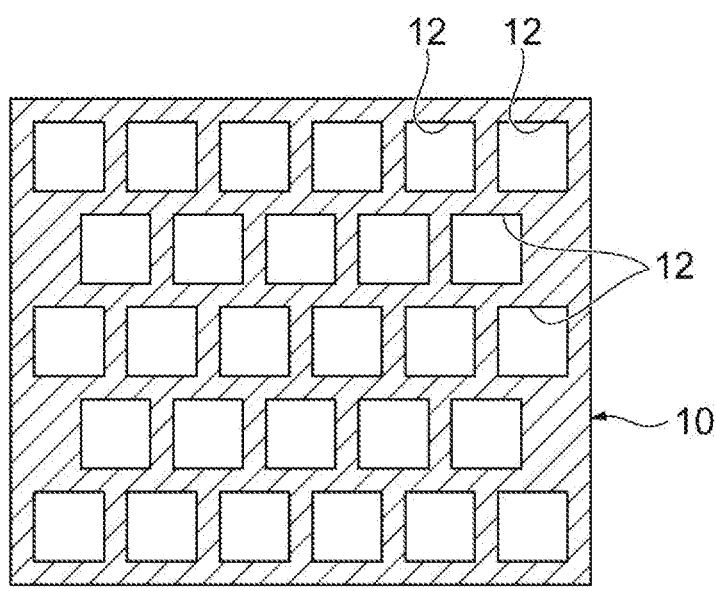

In the light guide portion 10 illustrated in FIGS. 7A to 7C, in the cross section (and the end surface), the plurality of light guide paths 12 are disposed in a zigzag shape at a predetermined interval (at 10 μm interval as an example). Each of the light guide paths 12 of the light guide portion 10 illustrated in FIG. 7A has a perfect circular cross-sectional shape (30 μm in diameter as an example), each of the light guide paths 12 of the light guide portion 10 illustrated in FIG. 7B has a hexagonal cross-sectional shape (30 μm in width as an example), and each of the light guide paths 12 of the light guide portion 10 illustrated in FIG. 7C has a square cross-sectional shape (30 μm square as an example).

What is claimed is:

1. A print head emitting imaging light, comprising:
   a light guide portion extending in a first direction and including a light blocking part and a plurality of light guide paths, the light blocking part having a lattice shape when viewed from the first direction, the plurality of light guide paths defined by the light blocking part, or the light blocking part including a plurality of light guide paths disposed in parallel or disposed in a zigzag shape when viewed from the first direction, the light blocking part defining the light guide paths, the light blocking part and the light guide paths are alternately arranged in the light guide portion in a second direction perpendicular to the first direction; and
   a light emitting element array disposed on one side of the light guide portion in the first direction, a plurality of light emitting elements emitting light incident to each of the light guide paths are arranged in the light emitting element array at an equal interval in the second direction,
   wherein the plurality of light guide paths have an identical width of 30 μm or less in the second direction, and
   wherein the identical width is larger than a width of a partition wall of the light blocking part.

2. The print head according to claim 1,
   wherein the width of the plurality of light guide paths is equal to or more than 10 μm.

3. The print head according to claim 1,
   wherein a width of the light blocking part at a location interposed between the light guide paths adjacent to each other in the second direction is equal to or less than 15 μm.

4. The print head according to claim 1,
wherein the light guide path has a perfect circular shape in a cross section orthogonal to the first direction.

5. The print head according to claim 1,
wherein the light guide path has a polygonal shape in a cross section orthogonal to the first direction.

6. The print head according to claim 1,
wherein the light emitting element is an organic EL element.

7. A print head emitting imaging light, comprising:
a light guide portion extending in a first direction and including a light blocking part and a plurality of light guide paths, the light blocking part having a lattice shape when viewed from the first direction, the plurality of light guide paths defined by the light blocking part, or the light blocking part including a plurality of light guide paths disposed in parallel or disposed in a zigzag shape when viewed from the first direction, the light blocking part defining the light guide paths, the light blocking part and the light guide paths are alternately arranged in the light guide portion in a second direction perpendicular to the first direction; and
a light emitting element array disposed on one side of the light guide portion in the first direction, a plurality of light emitting elements emitting light incident to each of the light guide paths are arranged in the light emitting element array at an equal interval in the second direction,
wherein the plurality of light guide paths have an identical width of 30 μm or less in the second direction, and
wherein a width of at least one of the plurality of light emitting elements is larger than the identical width, and the at least one of the plurality of light emitting elements overlaps at least two of the plurality of light guide paths in the second direction.

* * * * *